(12) United States Patent
Hood

(10) Patent No.: US 10,574,179 B2
(45) Date of Patent: Feb. 25, 2020

(54) WIRE TRAY FOR PV ASSEMBLY

(71) Applicant: David C. Hood, Lincoln, CA (US)

(72) Inventor: David C. Hood, Lincoln, CA (US)

( * ) Notice: Subject to any disclaimer, the term of this patent is extended or adjusted under 35 U.S.C. 154(b) by 0 days.

(21) Appl. No.: 15/634,323

(22) Filed: Jun. 27, 2017

(65) Prior Publication Data

US 2018/0131320 A1 May 10, 2018

Related U.S. Application Data

(60) Provisional application No. 62/355,036, filed on Jun. 27, 2016.

(51) Int. Cl.
| | | |
|---|---|---|
| *H02S 20/10* | (2014.01) | |
| *H02S 40/34* | (2014.01) | |
| *F16L 57/00* | (2006.01) | |
| *F16L 3/26* | (2006.01) | |
| *H02G 3/08* | (2006.01) | |
| *F16M 11/22* | (2006.01) | |
| *H02S 20/32* | (2014.01) | |
| *F16L 3/12* | (2006.01) | |
| *H02S 30/20* | (2014.01) | |
| *H02S 40/36* | (2014.01) | |
| *H02G 3/04* | (2006.01) | |

(52) U.S. Cl.
CPC ............ *H02S 40/34* (2014.12); *F16L 3/1218* (2013.01); *F16L 3/26* (2013.01); *F16L 57/00* (2013.01); *F16M 11/22* (2013.01); *H02G 3/083* (2013.01); *H02G 3/088* (2013.01); *H02S 20/32* (2014.12); *H02S 30/20* (2014.12); *H02S 40/36* (2014.12); *H02G 3/0456* (2013.01)

(58) Field of Classification Search
CPC ......... Y02E 10/47; Y02E 10/50; H02S 20/00; H02S 20/10; H02G 3/0418
See application file for complete search history.

(56) References Cited

U.S. PATENT DOCUMENTS

| | | | | |
|---|---|---|---|---|
| 3,701,836 | A | * 10/1972 | Ward | H02G 3/281 |
| | | | | 174/101 |
| 4,433,200 | A | 2/1984 | Jester et al. | |
| 5,125,608 | A | * 6/1992 | McMaster | F24J 2/5232 |
| | | | | 126/570 |
| 5,164,020 | A | 11/1992 | Wagner et al. | |

(Continued)

FOREIGN PATENT DOCUMENTS

| | | |
|---|---|---|
| JP | 2015158101 A | 9/2015 |
| KR | 101562850 B1 | 10/2015 |

OTHER PUBLICATIONS

PCT/US/2017/027782—International Search Report and Written Opinion dated Sep. 20, 2017, 10 pages.

*Primary Examiner* — Paola Agudelo
*Assistant Examiner* — Daniel J Kenny
(74) *Attorney, Agent, or Firm* — Haynes Beffel & Wolfeld LLP; Andrew L. Dunlap

(57) ABSTRACT

A PV assembly wire tray includes a PV panel-support purlin and a wire cover secured to the purlin. The purlin includes a web, having first and second ends, and first and second plates extending from the first and second ends. The wire cover includes a first panel, extending from the first end oft web, and a second panel extending from the second end of the web. A wire-protecting chamber is defined by the web, the second plate, the second panel and the first panel.

9 Claims, 5 Drawing Sheets

(56) References Cited

U.S. PATENT DOCUMENTS

| | | | |
|---|---|---|---|
| 7,126,059 B2* | 10/2006 | Dinh | H02G 3/14 |
| | | | 174/66 |
| 8,776,468 B2* | 7/2014 | Henriquez | E04B 1/161 |
| | | | 52/481.1 |
| 9,178,342 B2* | 11/2015 | Rodenberg | H02G 3/0425 |
| 2003/0070368 A1 | 4/2003 | Shingleton | |
| 2011/0265860 A1 | 11/2011 | Ciasulli et al. | |
| 2011/0303262 A1 | 12/2011 | Wolter | |
| 2012/0192925 A1 | 8/2012 | Grushkowitz et al. | |
| 2013/0256246 A1* | 10/2013 | Tagliamonte | H02S 20/00 |
| | | | 211/41.1 |
| 2014/0048498 A1 | 2/2014 | Kuan | |
| 2014/0137927 A1 | 5/2014 | Kim et al. | |
| 2014/0230886 A1* | 8/2014 | Werner | H02S 20/00 |
| | | | 136/251 |
| 2014/0246077 A1 | 9/2014 | Poulakis | |
| 2016/0268965 A1 | 9/2016 | Stearns et al. | |

* cited by examiner

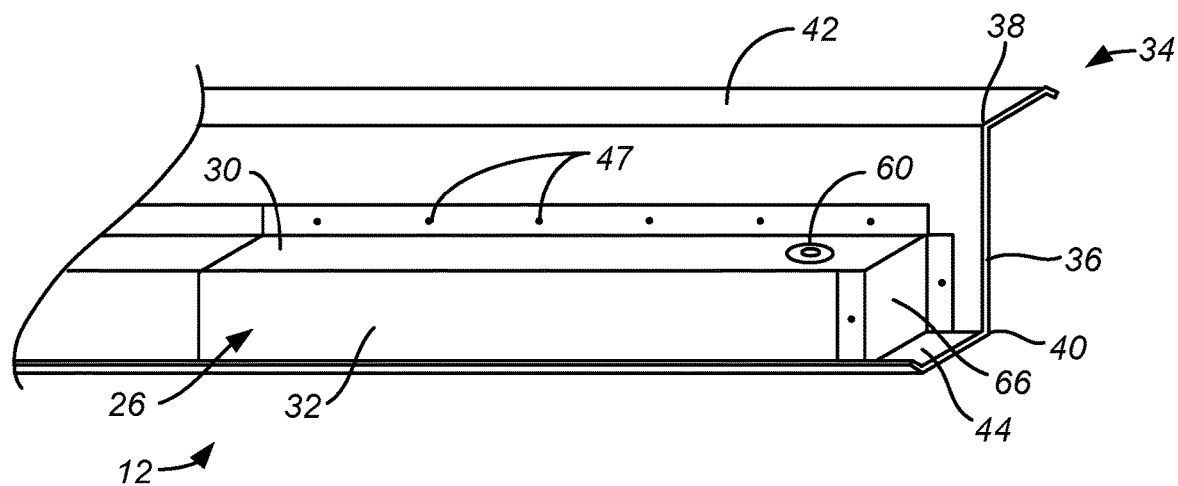
FIG. 2
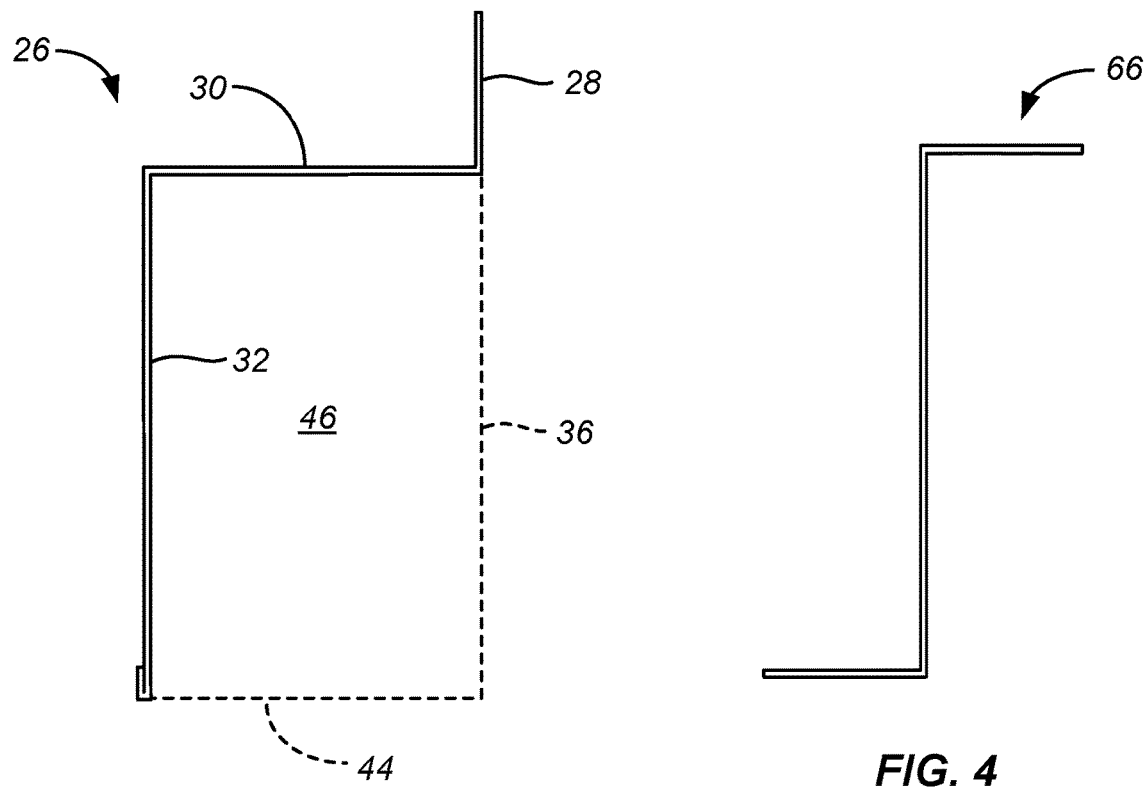
FIG. 3
FIG. 4

WIRE TRAY FOR PV ASSEMBLY

CROSS-REFERENCE TO OTHER APPLICATIONS

This application claims the benefit of U.S. provisional patent application No. 62/355,036 filed on 27 Jun. 2016 and entitled Wire Cover for Fixed Ground Mounted Photovoltaic Panels, the disclosure of which is incorporated by reference.

BACKGROUND OF THE INVENTION

Solar photovoltaic (PV) panels are typically provided of rigid planar form with each panel having a similar size, typically rectangular and approximately two to three feet in a shorter dimension and four to six feet in a longer dimension. Solar cells are provided upon a front surface of the solar panel. These individual cells are electrically connected together. A junction box is provided on a rear surface of each panel which gathers up the electric power generated by the cells on the panel and passes this electric power onto wires. These wires from the junction box can facilitate wiring together of multiple panels of an array to produce the overall power generated by the array of panels.

Solar panels are required to be deployed in an outside environment exposed to solar radiation, where the panels are also exposed to extremes of temperature and moisture. Furthermore, birds and other animals typically have access to the panels and the wiring connecting the panels together. One of the significant benefits of solar power systems of the PV panel variety is that they have no moving parts which must require maintenance or periodic inspection/replacement, as is the case with other distributed power assets such as wind turbines. However, the outside exposure experienced by the panel and its associated wires can result in damage occurring to the panels even without the panels experiencing any motion. Some solar panel arrays are mounted in a movable fashion to "track" the sun. Such tracking systems can be kept quite simple and easy to maintain, so that the panels do not require significant maintenance or inspection for reliable operation.

Perhaps the greatest source of PV panel array failure is presented in association with the wires that connect the individual panels together. The wires have connectors where they are joined to other segments of wire or to the junction boxes of various panels. If the wires become damaged, the system of PV panels can fail. The wires also benefit from minimizing expense through only providing an amount of exterior insulation necessary and to otherwise structure the wire with a relatively light and low cost configuration, including diameter, conductive material, insulating material, insulating material thickness, etc. Furthermore, the wires themselves can be extensive in length and represent a significant value for the overall panel system. It is known in certain instances for thieves to steal wire, such as the wire joining PV panels together, to recycle the wire for its inherent value in the conductive metals contained therein, or to repurpose the wire in other ways.

Panels provided in arrays which are fixed rather than configured to track the sun have a somewhat different but generally similar configuration. In particular, multiple separate panels are wired together in the manner desired to either have their currents summed together or to otherwise combine power from the individual panels. The undersides of the panels include junction boxes thereon to which this wiring connects. Runs of wire typically are located below this lower surface of the array of panels. The wiring is thus exposed for potential damage, theft, vandalism or other occurrences which can take the panels offline or otherwise prove to be undesirable. Covering these runs of wire can to some extent protect the wire from pests and/or the elements, and to some extent make theft or vandalism less likely.

SUMMARY

A PV assembly wire tray includes a PV panel-support purlin and a wire cover secured to the purlin. The purlin includes a web, having first and second ends, and first and second plates extending from the first and second ends. The wire cover includes a first panel, extending from the first end oft web, and a second panel extending from the second end of the web. A wire-protecting chamber is defined by the web, the second plate, the second panel and the first panel.

In some examples the PV assembly wire tray can include one or more the following. The first and second plates of the PV panel-support purlin can extend in opposite directions. The wire cover can have a hole for the passage of wires therethrough. The web can have an opening through which wires can pass. The assembly can also include a wire-chamber-terminating end cap secured to at least one of the purlin and the wire cover.

A PV assembly, supportable on a support surface, includes a PV panel support assembly and a wire cover. The PV panel support assembly includes a post, a racking system and PV panel-support purlins. The post is securable to the support surface to extend upwardly from the support surface. The racking system includes a top chord and a brace. The top chord is supported at the upper end of the post. The brace extends between the top chord and the post. The purlins are secured to and extend upwardly from the top chord. At least one of the purlins includes a web, having first and second ends, and first and second plates, extending from the first and second ends, respectively. The wire cover is secured to the purlin an includes a first panel, extending from the first end of the web, and a second panel, extending from the second end of the web. A wire-protecting chamber is defined by the web, the second plate, the second panel and the first panel.

Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 2 is a simplified front, right side oblique view of the wire tray of FIG. 1.

FIG. 3 is a right side elevation view of the wire cover of FIG. 2 showing its profile.

FIG. 4 is a top plan view of the end cap of FIG. 2 showing its profile.

DESCRIPTION OF THE INVENTION

Figure 1:
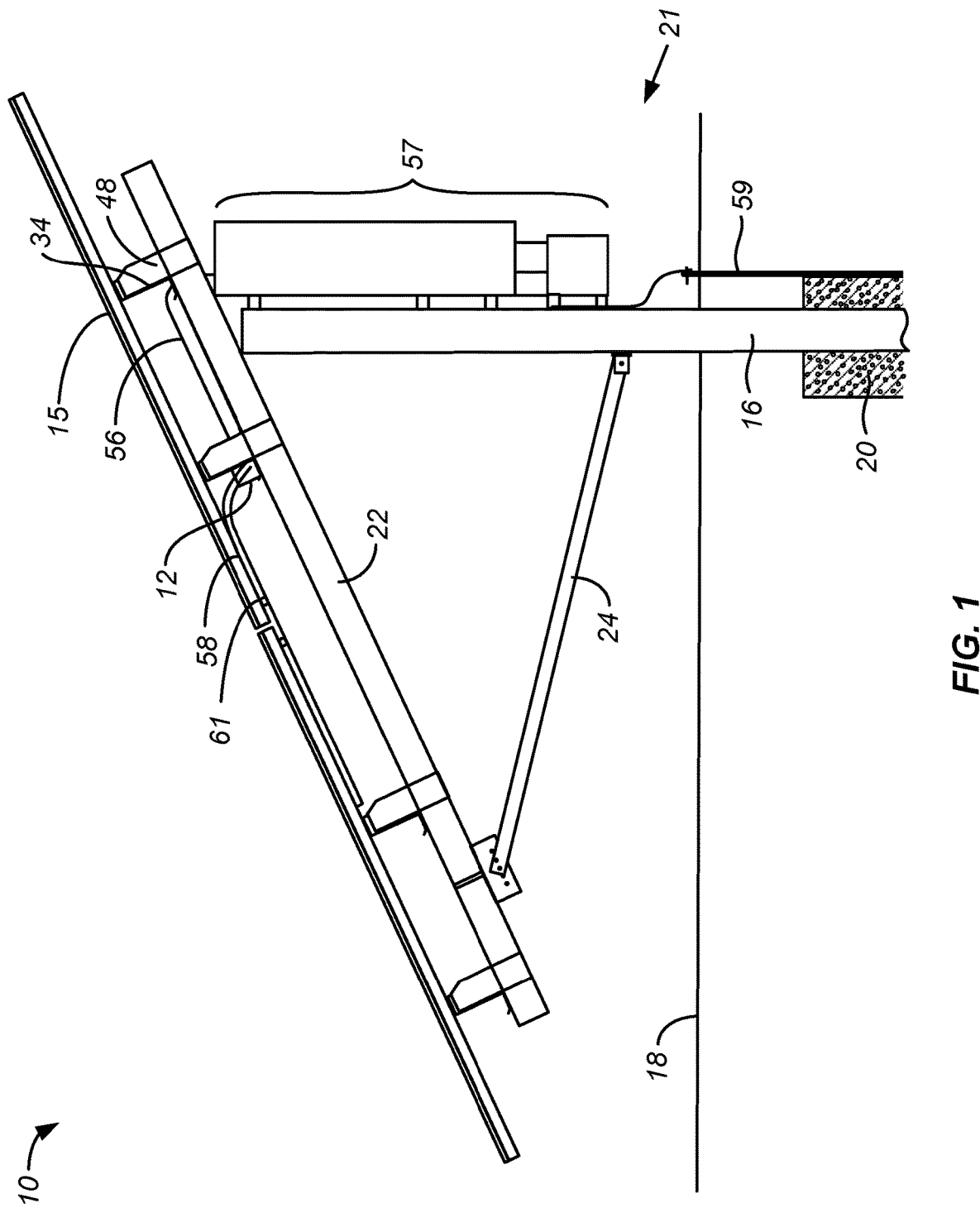
FIG. 1 is a right side elevation view of a ground mounted PV assembly including a PV assembly wire tray.

FIG. 1 a right side elevation view of a ground mounted PV assembly 10 including a PV assembly wire tray 12, wire tray 12 shown best in FIG. 2. PV assembly includes a PV panel support assembly 14 supporting PV modules 15, also referred to as PV panels 15. Assembly 14 includes a series of posts 16 (only one of which is shown in the Figs.) secured in place below the existing grade 18 by concrete foundation structures 20. Assembly 14 also includes a racking system 21 comprising top chords 22 supported at the upper ends of posts 16 and by braces 24.

As seen best in FIGS. 2 and 3, wire tray 12 includes a wire cover 26. Wire cover 26 has a mounting flange 28, a first panel 30, and a second panel 32 with the first panel connecting the mounting flange and second panel. A PV panel support purlin 34 is, in this example, a generally Z-shaped purlin, and includes a central web 36 having first and second ends 38, 40, a first plate 42 extending from the first end 38, and a second plate 44 extending from second end 40. As shown in FIG. 3, first panel 30, second panel 32, web 36 and second plate 44 define a wire-protecting chamber 46. Wire cover 26 is secured to web 36 of purlin 34 by fasteners 47.

Purlin 34 is part of racking system 21 and is secured to top chord 22 by mounting brackets 48 using fasteners 50 and 52, in this example nuts and bolts. This is illustrated best in FIGS. 6 and 7. Fasteners 50 secure mounting brackets 48 to top chords 22 while fasteners 52 secure purlin 34 to mounting bracket 48. Fasteners 54 are also used to secure purlin 34 to mounting bracket 48 but with the orientation of the nut and bolt reversed to allow the purlin to be used for wire management by the removal of selected fasteners 54 to provide access openings through web 36. For example, wires passing through the wire conduit 56 shown in FIG. 1 and directed to electronics 57 would typically pass through the opening provided by removing fastener 54. Electronics 57 typically includes at least one of a subpanel, an inverter, an inverter disconnect, and a gutter box. Electronics 57 is connected to a ground rod 59. Current-carrying wires 58 from the PV modules 15 with junction box 61 therealong, see FIG. 1, can pass into the wire-protecting chamber 46 through openings 60, see FIGS. 1 and 2. Opening 60 preferably have wire-protecting bushings to prevent damage to wires 58.

Figure 5:
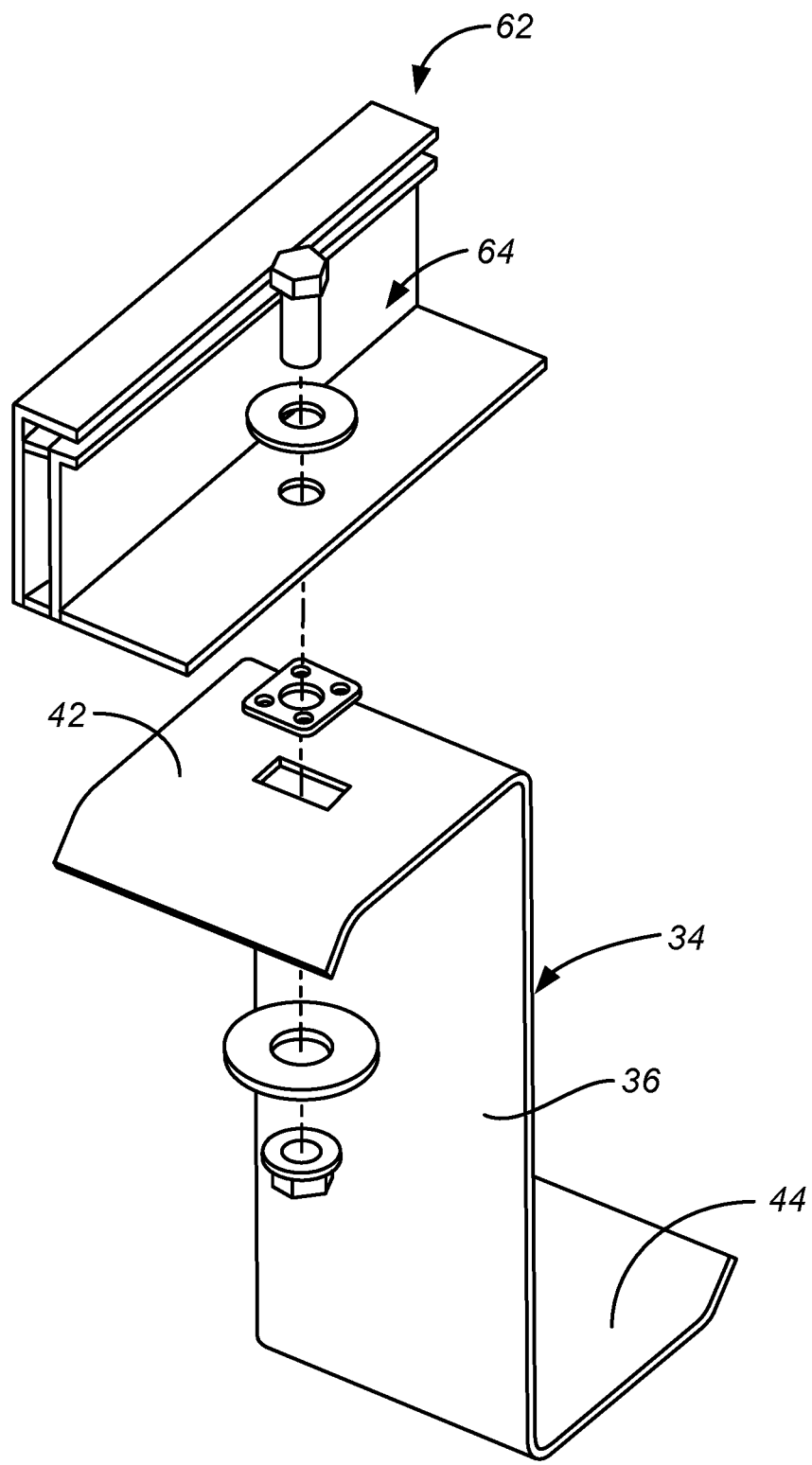
FIG. 5 is an exploded isometric view of a portion of the PV module frame and purlin of FIG. 1 showing the fasteners used to mount the PV module frame to the purlin.
Figure 6:
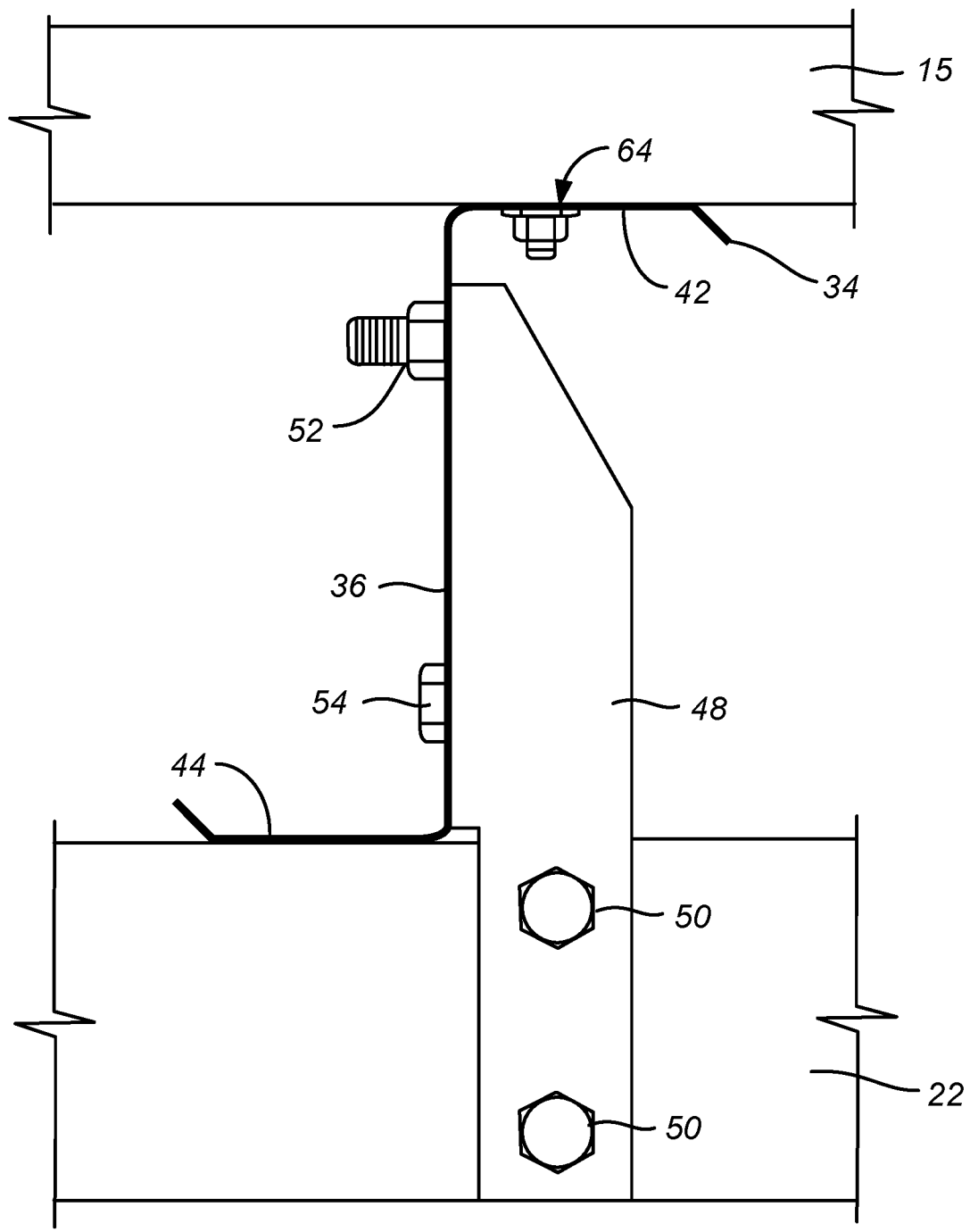
FIG. 6 is an enlarged right side elevation view of a portion of the structure of FIG. 1 with the wire cover removed.
Figure 7:
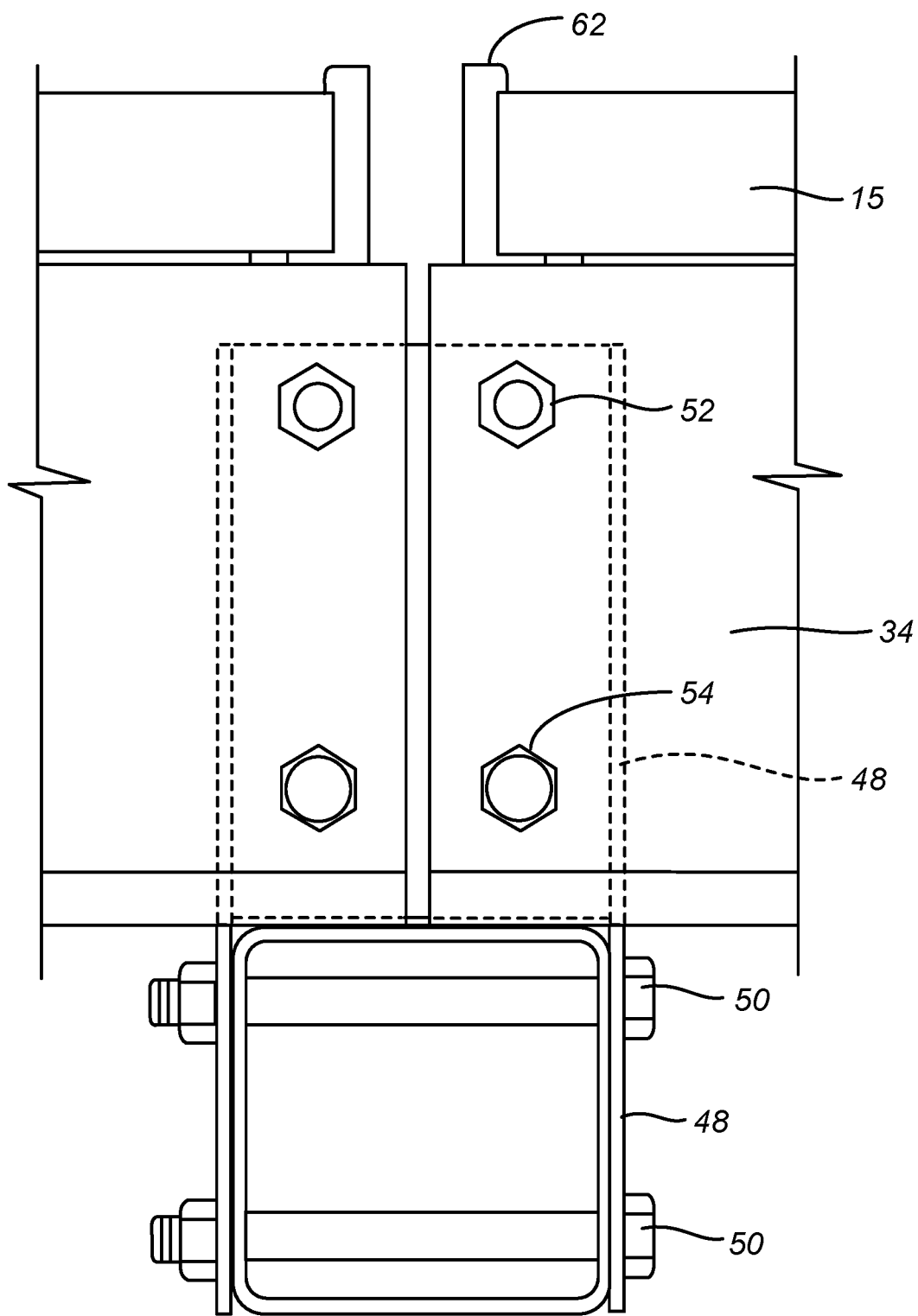
FIG. 7 is an enlarged front elevation view of the structure of FIG. 6.

Referring now to FIGS. 5-7, PV modules 15 have frames 62 by which the PV modules are secured to racking system 21 by purlins 34 using fastener assemblies 64. A fastener assembly 64 can have a bolt at one end and a flange nut at the other.

Wire trays 12, created by wire covers 26 and purlins 34, have a span which typically extends over the entire width of one or more PV modules 15. A typical span for wire trays 12 is 10 feet. The wire tray 12 at the end of a row of PV modules 15 is covered by an end cap 66, see FIGS. 2 and 4, to inhibit unwanted access into the interior of chamber 46 by, for example, people, the weather, and animals.

Wire tray 12 at least partially encapsulates runs of wire which are interconnecting separate photovoltaic (PV) panels 15 together in PV array. While wire tray 12 could conceivably be used with PV arrays of some form of sun tracking variety, wire tray 12 finds particular utility when used with fixed ground mount systems.

The PV arrays are generally oriented parallel with each other and in an orientation optimized for power generation and/or to suit other design criteria. Rows of parallel and typically coplanar PV panels 15 are arranged so that individual panels are adjacent to each other with each panel having lateral edges closest to adjacent panels and upper and lower edges perpendicular to the lateral edges and with the upper edges generally aligned with those of adjacent PV panels and elevated higher than the lower edges. Each PV panel has a rear surface and a front surface. The front surface faces the source of solar radiation and the back surface is parallel and opposite the front surface. This back surface has junction boxes with typically one junction box for each panel.

Wiring is connected to the junction boxes. In one common scenario the junction box includes two lead wires or terminals to which wires can be attached. Wiring is provided of two purposes. One purpose of the wire wing is to connect each PV panel to adjacent PV panels on either side thereof. One wire is connected to a junction box of a panel to the left and the other lead is connected to a junction box of a panel to the right.

Each row of PV panels 15 will eventually have an end PV panel. This end PV panel will be wired to an adjacent PV panel through one lead of its junction box. The other lead of the junction box connects to a wire "home run" which will typically extend adjacent to the back side of each of the PV panels without connecting to the junction boxes thereof. This home run will be interfaced into a power collection system along with a wire connected to a junction box at an end of the row opposite the end which fed the home run. Such a series circuit will result in a voltage matching a voltage of each PV panel and a current which is a sum of the electric currents generated by each of the panels. Other PV panel interconnection arrangements could conceivably be provided as alternatives to that described above.

The junction boxes are typically and preferably located in similar locations on each PV panel, typically closer to the upper edge than to the lower edge and on the back surface thereof. The PV panels can be supported to the fixed PV panel support assembly 14 in a variety of different ways. The PV panel support assembly 14 supports the structural loads of the PV panels 15 so that they remain stationary. Loads on the panels typically include gravity loads and to some extent wind loads, seismic loads, loads associated with installation and handling by personnel, and other miscellaneous loads.

In a common arrangement, this fixed ground mount structure will include horizontal channel members, such as purlins 34, which run perpendicular to the lateral edges of the PV panels 15 and typically span the entire row. If the row is sufficiently long, multiple channel segments can be provided along a common line, being either fastened together, welded together or otherwise supported along a common line.

In one embodiment, such a channel is provided adjacent the upper edge of each PV panel in the row and a separate channel of some sort is also provided adjacent the lower edge of each PV panel in the row (with mid channels also optionally provided). Further structural members can connect to these channel members to carry loads from the panels through the channel members and down to a foundation structure. The foundation structure might typically involve concrete poured into a footing, for example to create concrete foundation structures 20, and with a structural member, for example posts 16, extending up from this concrete footing. Intermediate structural members can include one or more intermediate members which can be arranged as trusses or in any of a variety of different configurations to carry the loads from the channels adjacent to the PV panels down to the foundation structure.

The upper channel member can be directly adjacent to each of the PV panels and typically just above where the junction boxes are located. Thus, the two wire runs including the home run and the run of wire interconnecting adjacent PV panels together are typically just below this upper channel and generally extending parallel with the upper channel member. Wire tray 12 is created by two different structures: wire cover 26 and purlin 34. In other examples wire tray 12 could be provided by a single structural member.

The first and second plates are preferably substantially parallel with each other and perpendicular to the web. In one embodiment the adjacent plate and distal plate on common sides of the web so that the web has a "C" shape in cross-section, and in another embodiment (depicted in FIG. 1) the first and second plates are on opposite sides of the web so that purlin 34 is generally Z-shaped. In either configuration (as well as others}, an interface between second plate 44 and web 36 (which are typically perpendicular to each other) are sized to work with the first and second panels 30, 32 of the wire cover 26 to produce wire chamber 46.

This wire chamber is at least three sided, and most typically four sided (though optionally with five or more sides) in cross-section with two sides thereof typically provided by the wire cover 26 and two sides thereof typically provided by purlin 34.

The wire cover 26 has at least two panels including first and second panels 30, 32 which are preferably perpendicular to each other. In alternative embodiments they could be somewhat non-perpendicular but still spaced away from parallel. A cross-sectional area of the wire chamber 46 is generally sized as the product of the length of the first panel 30 and the second panel 32 of the wire cover 26. The first panel 30 is provided adjacent to the web 36 and is preferably substantially perpendicular to the web. The second panel 32 is perpendicular to the first panel 30 in this embodiment and oriented perpendicular to the second plate 44 of purlin 34 and parallel with the web 36.

Mounting flange 28 is preferably perpendicular to the first panel 30. The flange 28 can receive fasteners to hold the wire cover 26 to the web 36 of the purlin 34. Such fasteners can include rivets, screws, adhesive or other fasteners for coupling the flange of the wire tray to the web of the channel. Once so attached, the wire chamber 46 between the wire cover 26 and the channel is substantially enclosed.

The wire cover 26 can be formed of galvanized steel or other steel or other metal materials. As a further alternative, the wire cover 26 could be formed of plastic materials, including plastic materials which can be extruded or injection molded. Preferably, the wire cover 26 is provided in sections which are of a convenient length to avoid or minimize the need to cut the wire covers 26. In one embodiment the wire covers 26 have a length similar to a width between adjacent edges of each PV panel. Thus, the number of wire covers 26 to be utilized would match the number of PV panels in each row. In such an arrangement, each wire cover 26 would actually have a slightly greater length so that adjacent wire covers 26 could overlap each other somewhat. For instance, if the PV panels have a width of twenty-four inches, the wire covers 26 could be provided with a length of twenty-five inches so that adjacent wire covers 26 could overlap by one inch at ends thereof.

End caps are also preferably provided for each of the ends of the wire covers 26 at the ends of each row of PV panels. Such end caps can have a configuration similar to that shown in FIG. 1 to close off the chambers at the end of the wire covers 26, and generally including a main plate with opposing flanges, and with the flanges attachable to adjacent structures including the web of the channel and the second panel of the wire cover 26.

Appropriate fasteners can be utilized, such as those utilized to fasten the flange to the web, so that the end cap can remain in place to substantially enclose the wire chamber.

Each wire cover 26 preferably includes at least one hole in the first panel thereof strategically located adjacent to where a junction box is provided on each PV panel. To the extent junction boxes might be located at different locations on the PV panels or if the wire covers 26 are provided in lengths greater than a length for each PV panel, holes can be provided at regular intervals and the first panel of the wire cover 26 (or elsewhere on the wire cover 26) which holes can be initially filled with blanks and only perforated to simplify the removal of the blanks from the holes which are desired to be accessed by wires.

Bushings can be provided which fill these holes entirely except with small gaps for allowing wiring to pass therethrough. In one embodiment, holes are provided in pairs, one for each wire coming from the junction box, with a bushing in each hole. In another embodiment, a single hole is fitted with a bushing having two holes therein, one for each wire. In one embodiment, the holes are provided with slots that extend to an edge of the first panel and through the flange to facilitate wire cover 26 installation after the junction boxes have been wired together, to facilitate wire cover 26 placement after PV panel array wiring. Specialty bushings can fill these slots if desired. Typically only the wiring of the one line joining adjacent panels together would pass through these holes in the wire cover 26.

The home run would just run continuously through the wire chamber. The bushings can assist in keeping moisture out of the chamber and keeping rodents out of the chamber or other pests.

If desired each section of wire cover 26 can be tapered at ends thereof slightly to facilitate overlapping attachment, but typically the wire covers 26 are sufficiently thin and flexible to accommodate overlapping without size adjustment.

This disclosure is provided to reveal a preferred embodiment of the technology and a best mode for practicing the technology. Having thus described the technology in this way, it should be apparent that various different modifications can be made to the preferred embodiment without departing from the scope and spirit of this disclosure. When structures are identified as a means to perform a function, the identification is intended to include all structures which can perform the function specified. One or more elements of one or more claims can be combined with elements of other claims. Any and all patents, patent applications and printed publications referred to above are incorporated by reference.

What is claimed is:
1. A photovoltaic (PV) assembly wire tray comprising:
a PV panel-support purlin comprising:
    a web having first and second ends; and
      first and second plates extending from the first and second ends, respectively, wherein the second plate includes opposing inner and outer edges, the outer edge being further away from the web than the inner edge;
a wire cover secured to the purlin, the wire cover comprising:
a first panel outwardly extending from the web; and
a second panel upwardly extending from the second plate,
wherein the wire cover including the first panel and the second panel does not extend beyond the outer edge of the second plate; and
a wire-protecting chamber defined by the web, the second plate, the second panel and the first panel, wherein the wire-protecting chamber has a rectangular cross-sectional shape.

2. The PV assembly wire tray according to claim 1, wherein the first and second plates of the PV panel-support purlin extend in opposite directions.

3. The PV assembly wire tray according to claim 1, wherein the wire-protecting chamber has a rectangular cross-sectional shape.

4. The PV assembly wire tray according to claim 1, wherein the wire cover comprises a hole for the passage of wires therethrough.

5. The PV assembly wire tray according to claim 1, wherein the web has an opening through which wires can pass.

6. The PV assembly wire tray according to claim 1, further comprising a wire-chamber-terminating end cap secured to at least one of the PV panel-support purlin and the wire cover.

7. The PV assembly wire tray according to claim 1, wherein the first and second plates are generally parallel to one another and extend from the first and second ends in opposite directions.

8. A photovoltaic (PV) assembly, supportable on a support surface, the PV assembly comprising:
a post securable to the support surface to extend upwardly from the support surface, the post having an upper end;
a racking system comprising a top chord and a brace, the top chord supported at the upper end of the post, and the brace extending between the top chord and the post;
PV panel-support purlins secured to and extending upwardly from the top chord, at least one of the PV panel-support purlins comprising:
a web having first and second ends; and
first and second plates extending from the first and second ends, respectively,
wherein the second plate includes opposing inner and outer edges, the outer edge being further away from the web than the inner edge;
a wire cover secured to the at least one PV panel-support purlin, the wire cover comprising:
a first panel outwardly extending from the web; and
a second panel upwardly extending from the second plate,
wherein the wire cover including the first panel and the second panel does not extend beyond the outer edge of the second plate; and
a wire-protecting chamber defined by the web, the second plate, the second panel and the first panel, wherein the wire-protecting chamber has a rectangular cross-sectional shape.

9. The PV assembly according to claim 8, wherein the first and second plates are parallel to one another and extend from the first and second ends in opposite directions.

* * * * *